United States Patent [19]

Smithrick

[11] Patent Number: 4,584,249

[45] Date of Patent: Apr. 22, 1986

[54] OXYGEN RECOMBINATION IN INDIVIDUAL PRESSURE VESSEL NICKEL-HYDROGEN BATTERIES

[75] Inventor: John J. Smithrick, Cleveland, Ohio

[73] Assignee: The United States of America as represented by the Administrator of the National Aeronautics and Space Administration, Washington, D.C.

[21] Appl. No.: 625,077

[22] Filed: Jun. 27, 1984

[51] Int. Cl.$^4$ .......................................... H01M 10/34
[52] U.S. Cl. ........................................ 429/57; 429/27; 429/101
[58] Field of Search ............................ 429/27, 57, 101

[56] References Cited

U.S. PATENT DOCUMENTS

| | | | |
|---|---|---|---|
| 3,102,059 | 8/1963 | Harmer | 429/57 X |
| 3,930,890 | 1/1976 | Dietz | 429/57 X |
| 4,002,496 | 1/1977 | Nitta et al. | 429/57 X |
| 4,078,893 | 3/1978 | Gilman et al. | 429/57 X |
| 4,115,630 | 9/1978 | Van Ommering et al. | 429/101 X |
| 4,127,703 | 11/1978 | Holleek | 429/72 X |
| 4,177,328 | 12/1979 | Rogers | 429/81 |
| 4,215,184 | 7/1980 | Gutmann et al. | 429/101 |

Primary Examiner—Brian E. Hearn
Assistant Examiner—Stephen J. Kalafut
Attorney, Agent, or Firm—James A. Mackin; John R. Manning

[57] ABSTRACT

An object of the invention is to provide for a metal-hydrogen cell one or more catalyzed sites for the recombination of oxygen generated at the metal electrodes with hydrogen contained in the cell.

In a metal-hydrogen cell of the type including a plurality of electrical cell units in back-to-back relationship and which may be lined with a wick, one or more catalyzed sites are provided on the inner surface of the cell. Separators disposed between the respective metal and hydrogen electrodes of each cell unit are provided with gas directing notches around their peripheries to facilitate the desired movement of gasses within the metal-hydrogen cell. Any two metal electrodes separated by a gas screen and including apertures which may be required to accommodate compression means such as bolts are provided with gas tight sealing means between the electrodes at each aperture. The sealing means may be a ring of rubber or elastomeric material which is somewhat compressible but non-reactive with other materials in the cell.

18 Claims, 3 Drawing Figures

OXYGEN RECOMBINATION IN INDIVIDUAL PRESSURE VESSEL NICKEL-HYDROGEN BATTERIES

DESCRIPTION

Origin of the Invention

The invention described herein was made by an employee of the U.S. Government and may be manufactured and used by or for the Government for governmental purposes without the payment of any royalties thereon or therefor.

TECHNICAL FIELD

The invention relates to secondary batteries or cells and is directed more particularly to metal-hydrogen batteries or cells.

It is expected that in the near future nickel-hydrogen (Ni-$H_2$) cells will replace nickel cadmium batteries as secondary electrical batteries in satellite applications. For satellites which will be placed in low earth orbits, it is necessary that the satellite batteries have the capability of being nearly completely discharged and recharged thousands of times. Such deep discharges and subsequent recharges have a number of adverse effects on a nickel hydrogen cell. For example, concentrated bubbles of oxygen generated during charging chemically recombined with hydrogen at the catalyzed hydrogen electrode causing localized burning. Over a period of time, this effect could significantly reduce the surface area of the catalyzed hydrogen electrode. It could also cause an increase in polarization and a corresponding decrease in cell power.

Additionally, the chemical recombination of oxygen and hydrogen form water at the hydrogen electrode and may cause flooding. Since the hydrogen electrode is a gas diffusion electrode, such flooding would adversely effect its performance.

Other problems with prior art nickel hydrogen cells include drying of the nickel electrodes as a result of transfer of oxygen from the nickel electrodes to the hydrogen electrodes. This is equivalent to the transfer of water away from the nickel electrode. When the oxygen recombines with hydrogen at the hydrogen electrodes heat is generated in the area of the hydrogen electrodes. This causes a thermal management problem.

Pertinent prior art patents are as follows:

U.S. Pat. No. 4,177,328 to Rogers discloses a wall wick for a nickel-hydrogen cell having a zirconium oxide ceramic deposited on the inside wall of the pressure vessel to wick electrolyte from a reservoir to the stack components.

U.S. Pat. No. 4,115,630 to VanOmmering et al discloses a metal-hydrogen battery with back-to-back electrode placement. In one embodiment the metal electrodes are nickel.

U.S. Pat. No. 4,127,703 to Holleck concerns a nickel-hydrogen secondary battery wherein oxygen produced by the operation of the battery is reconverted to water at the hydrogen electrodes which include a catalyst to enhance the reconversion.

U.S. Pat. No. 4,215,184 to Gutmann et al discloses a nickel-oxide/hydrogen battery in which thermal conductivity away from the electrode stack is achieved by making the catalyst for the negative electrode as an integral part of the gas diffusion element.

DISCLOSURE OF THE INVENTION

It is an object of the invention to provide a metal-hydrogen cell which avoids damage and retards flooding of the hydrogen electrodes by providing for chemical recombination of oxygen and hydrogen in areas or sites remote from the hydrogen electrodes.

Still another object of the invention is to provide a metal-hydrogen cell or battery having gas flow directing means causing gases in the cell to achieve maximum contact with the remote recombination areas.

In accordance with the invention, a nickel-hydrogen cell of the type having electrical cell units disposed in back-to-back relationship in a pressure vessel is provided with a plurality of catalytic areas on the inner surface of the pressure vessel so that oxygen from nickel electrodes of the electrical cell units recombines with hydrogen at the catalytic areas rather than on the hydrogen electrodes as in the prior art. Separators between the nickel and hydrogen electrodes of each of the electrical cell units are notched around their peripheries to enhance movement of gases in the pressure vessel in a desirable manner. Additionally, sealing means is provided between any nickel electrodes separated by a gas screen, the sealing means being in register with any apertures provided for clamping means such as bolts, for example.

BRIEF DESCRIPTION OF THE DRAWINGS

The details of the invention will be described in connection with the accompanying drawings in which.

DETAILED DESCRIPTION OF THE INVENTION

Figure 1:
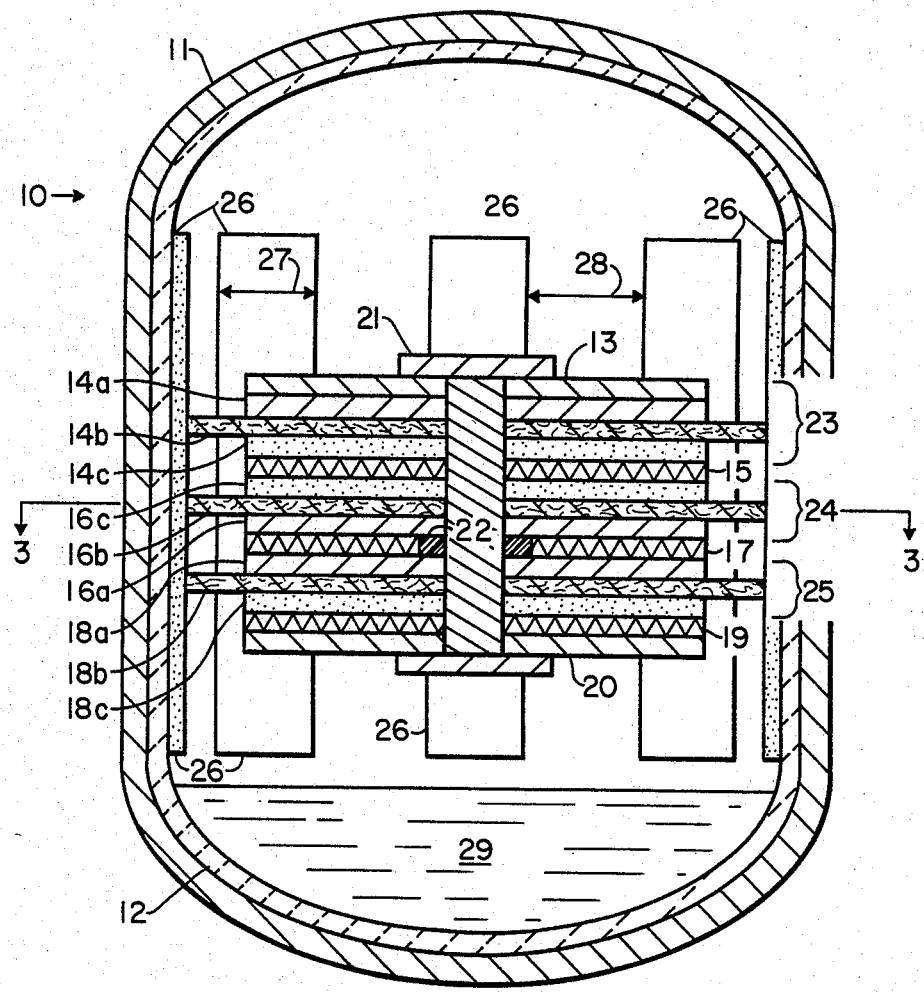
FIG. 1 is a longitudinal, cross-sectional view of a nickel-hydrogen cell embodying the invention.

Referring now to FIG. there is shown a nickel-hydrogen cell comprising a pressure vessel 11 formed from a metal which is essentially nonreactive with the gases and the electrolyte to be utilized in the cell. A coating 12 on the inner surface of the pressure vessel 11 is a porous ceramic material which serves as a wick. The wick 12 may be a material such as $ZrO_2$. Starting from the top, as viewed in FIG. 1, there is provided an electrical stack comprised of an end plate 13, a nickel electrode 14a, a separator 14b, a hydrogen electrode 14c, a gas green 15, a hydrogen electrode 16c, a separator 16b, a nickel electrode 16a, a gas screen 17, a nickel electrode 18a, a separator 18b, a hydrogen electrode 18c, a gas screen 19, and an end plate 20. The components 13 through 20 are clamped or compressed together by a compressive means such as a bolt 21 which extends through aligned apertures in the stack components.

In operation of the nickel-hydrogen cell, oxygen gas is generated at the nickel electrodes. With regard to the nickel electrodes 16b and 18a in particular, it is desirable that the oxygen pass through the screen 17 toward the pressure vessel 11. Accordingly, to prevent oxygen from escaping and passing along the bolt 21, there is disposed around bolt 21 between nickel electrodes 16b and 18a a seal 22 which may be an elastomeric ring of hard rubber or a plastic not subject to attack by the electrolyte and gasses of the cell.

The nickel-hydrogen cell 10 of FIG. 1 includes electrical cell units 23, 24 and 25. The gas screen 15 separates cell unit 23 from cell unit 24 while the gas screen 17 separates cell unit 24 from cell unit 25. Cell units 23, 24 and 25 are considered to be in a back-to-back relationship because the hydrogen electrode 14c of unit 23 is separated from the hydrogen electrode 16c of unit 24 by the gas screen 15 while the nickel electrode 16a of cell 24 is separated from the nickel electrode 18a of cell 25 by the screen 17. It will be understood, that additional cell units may be provided with the back-to-back relationship being maintained in the added cell units.

The electrical connections to the electrodes of the nickel-hydrogen cell 10 are not shown in FIG. 1. However, numerous means for connecting leads to the electrodes are known in the prior art and, generally, the nickel elctrodes 14a, 16a and 18a will be connected together to provide positive output. Similarly, hydrogen electrodes 14c, 16c and 18c will be connected together to provide a negative output.

As in state of the art nickel-hydrogen cells, hydrogen electrodes 14c, 16c and 18c are made of a polymer such as polytetrafluoroethylene (PTFE) containing powdered platinum, the density of which is high at the surfaces which will be contacted by either a gas screen or a separator. The gas screens 15, 17 and 19 are highly porous polypropylene mats. The separators 14b, 16b and 18b are fuel cell grade asbestos.

Because the platinum powder in the PTFE hydrogen electrodes 14c, 16c and 18c catalyzes a recombination of oxygen from the nickel electrodes with hydrogen at the hydrogen electrodes, certain problems occur. As discussed previously, these problems include flooding of the hydrogen electrode and the production of hot spots on the hydrogen electrode.

To the end that the recombination of $O_2$ and $H_2$ will preferentially occur on the inner surface of the wick coating 12 or on the inner surface of the pressure vessel 11 if no wick is used, catalyzed areas or sites 26 are provided on the inner surface of pressure vessel 11 or on the inner surface of wick 12 if such a wick is utilized. These catalyzed sites 26 may be in the form of catalyzed strips 26. When a wick 12 is provided, the total area of the catalytic sites must be limited. This is because the separators 14b, 16b and 18b must make adequate contact with the wick 12 to obtain an electrolyte such as KOH by capillary action from a reservoir 29.

To maintain adequate contact of the separators 14b, 16b and 18b with the wick 12, the area of the catalytic sites 26 must be no greater than 30% of the total required inner surface area of the wick 12. The width of the catalytic strips 26 is defined by the double ended arrow 27 while the spacing between the strips is indicated by the double arrow 28. Preferably, the spacing 28 should be twice the width 27 of the strips.

Figure 2:
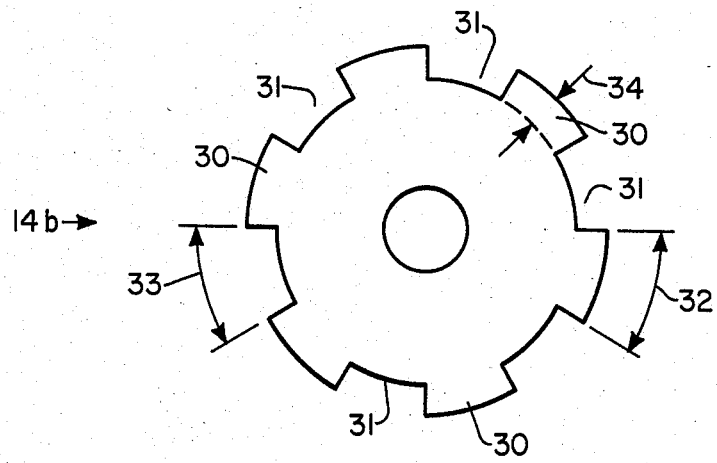
FIG. 2 is a plan view of a separator used in the invention.

Referring now to FIG. 2, there is shown a separator 14b which is generally the same as separators 16b and 18b. Separator 14b is provided with outwardly extending segments 30 which establish a plurality of notches 31 at its periphery. The peripheral length of the segments 30 is defined by the double ended arrow 32 while the peripheral length of the resulting notches is defined by the double ended arrow 33.

Because the separator 14b obtains its electrolyte by virtue of contact of the segments 30 with the wick 12 which is disposed on the interior wall of the pressure vessel 11 of FIG. 1, the total segment length obtained by adding the peripheral length 32 of each of the segments 30 must be on the order of at least three times the total notch length obtained by adding the peripheral length 33 of each of the notches 31. There is no requirement that the peripheral length of the segments 30 be equal or that the peripheral length 33 of the notches be equal.

The height of any segment 30 is defined by the arrows 34 and is equal to the depth of any notch 31. It will be understood by those skilled in the art, that because the separators 14b, 16b and 18b are fuel grade asbestos, the segments 30 may be compressed inwardly upon installation in a pressure vessel. This would obviously reduce the dimension 34 of each of the segments 30.

Figure 3:
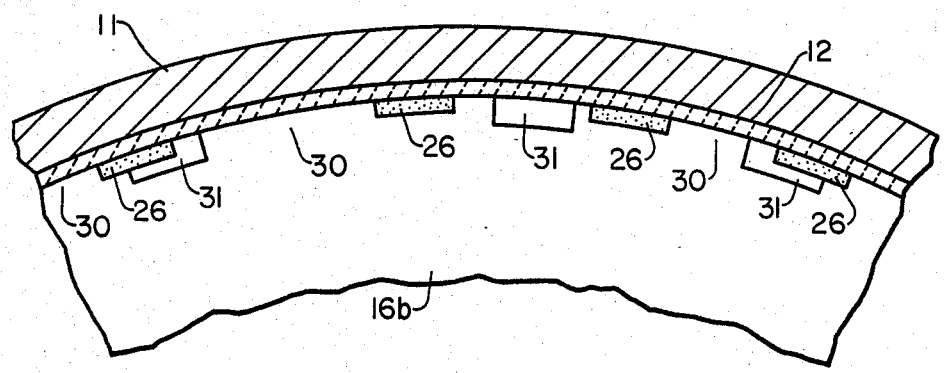
FIG. 3 is a partial view of a transverse, cross-section taken along the line 3—3 of FIG. 1.

FIG. 3 which is a partial transverse cross-sectional view taken along the line 3—3 of FIG. 1 shows a separator 16b with segments 30 and notches 31. There are also shown the catalytic strips 26 disposed on the wick wall 12 which is coated onto the inner surface of the pressure vessel 11.

As shown, the notches 31 have no particular placement with respect to the catalytic strips 26. However, the notches 31 would be preferably located at or in register with respective catalytic strips 26. This would enhance contact of gasses in the cell with the catalytic strips 26.

Because the catalytic strips 26 are extremely thin, on the order of 1.5 to 3.5 mils, and because the separator material is soft, no special accommodation has to be made in the periphery of the separator for the catalytic strips. Thus, unless the notches 31 of the separators 14b, 16b and 18b are meant to be in registry with a respective catalytic strip 26, the edges of the separators will be adequately deformed by the catalytic strips 26 themselves.

While the illustrations of FIGS. 1 and 3 show a nickel-hydrogen cell having a ceramic wick 12 and an electrolyte reservoir 29, such structures are not required nor are they critical to the operation of the instant invention. Thus, the wick 12 and the reservoir 29 may be eliminated with the cell operation being based upon saturation of the separators 14b, 16b and 18b with electrolyte prior to assembly.

Other possibilities include rotating the cell as shown in FIG. 1 ninety degrees in either direction whereby the separators 14b, 16b and 18b will be contacted directly by the electrolyte. Further, the stack of cells 23, 24 and 25 could itself be rotated through ninety degrees whereby the separators are directly wetted by the electrolyte. In this latter case the catalytic strips 26 would preferably be repositioned as bands around the inner surface of the pressure vessel 11.

The purpose of spacing the catalytic strips 26 is so that the separators 14b, 16b and 18b make adequate contact with the wick 12 to provide the required amount of electrolyte from the reservoir 29. Consequently, if the wick 12 is not used, the entire interior surface of the pressure vessel 11 may be provided with the catalytic material. However, the total area of the catalytic material need only be of an amount sufficient to provide for maximum recombination of hydrogen and oxygen at the vessel wall 11 to minimize recombination at the hydrogen electrodes 14c, 16c and 18c.

As discussed previously, the electrodes 14a 16a and 18a are nickel although use of any metal previously known in the prior art for use in metal hydrogen cells may be utilized. Nickel electrodes are commercially available from a number of companies.

Similarly, the hydrogen electrodes 14c, 16c and 18c are commercial items made from a polymer such as polytetrafluoroethylene (PTFE) and filled with a catalytic material such as platinum powder. The catalytic material, such as catalytic strips 26, applied to the inner surface of the wick 12 or the pressure vessel 11 if the wick is not used, is the same material as the hydrogen electrodes 14c, 16c and 18c. The catalytic coating is applied as a thin layer by using a suitable blade. Brushing or spraying techniques may also be used.

It will be understood that changes and modifications may be made to the foregoing-described invention by those skilled in the art without departing from the spirit and scope of the invention, as set forth in the claims appended hereto.

I claim:

1. An improved metal-hydrogen ($H_2$) cell of the type comprising a pressure vessel pressurized with $H_2$ and including an electrolyte and a stack of electrical cell units disposed in said pressure vessel in back-to-back relationship with gas screens positioned between adjacent electrical units; the improvement comprising one or more sites of catalytic material disposed on the inner surface of the pressure vessel and wherein each electrical cell unit includes a separator plate having edges in contact with a porous ceramic wick coating disposed on a portion of the pressure vessel interior and partially immersed in a supply of electrolyte whereby electrolyte is wicked to the separators, the separator edges being notched whereby gases in the cell flow adjacent to the catalytic sites to maximize recombination of $O_2$ generated by operation of the cell with $H_2$ outside of the electrical cell units on the pressure vessel catalytic sites whereby the heat of recombination is effectively removed from the cell.

2. The cell of claim 1 wherein said catalytic material is a polymer filled with a powder which is catalytic to $H_2$-$O_2$ reactions.

3. The cell of claim 2 wherein said polymer is polytetrafluoroethylene.

4. The cell of claim 3 wherein said powder is platinum.

5. The cell of claim 1 wherein said catalytic material is about 0.0015 to 0.0035 inches thick.

6. The cell of claim 1 wherein the catalytic sites are strips of catalytic material disposed on the wick coating.

7. The cell of claim 6 wherein the total area of the strips of catalytic material is no more than 30% of the total wick area.

8. The cell of claim 6 wherein the catalytic strips are equally spaced apart.

9. The cell of claim 6 wherein the strips are generally perpendicular to the separators.

10. The cell of claim 6 wherein the separator nothces are in register with the strips of catalytic material.

11. The cell of 1 wherein the notches are interspersed between separator segments and wherein the total length of the segments is about three times greater than the total length of the notches.

12. The cell of claim 1 wherein the wick coating and the sites of catalytic material are in the form of alternating strips generally perpendicular to the separators.

13. The cell of claim 1 wherein each cell unit comprises a metal electrode and a $H_2$ electrode with a separator therebetween and including gas sealing means between any two metal electrodes which are separated by only a gas screen and at the location of any aperture in the metal electrodes.

14. The cell of claim 13 wherein said gas sealing means is a ring of compressible, electrically non-conductive material which is non-reactive with the cell electrolyte.

15. The cell of claim 14 wherein said ring is an elastomeric material.

16. The cell of claim 13 wherein said electrolyte is KOH.

17. The cell of claim 1 wherein each of said electrical cell units includes a nickel electrode and wherein the electrolyte is selected from the group consisting of NaOH and KOH.

18. The cell of claim 17 wherein each electrical cell unit includes a hydrogen electrode of the same material as the catalytic sites.

* * * * *